Webster

United States Patent [19]

[11] 4,187,883
[45] Feb. 12, 1980

[54] MULTIPLE POSITION VALVE
[75] Inventor: George R. Webster, Houston, Tex.
[73] Assignee: Cameron Iron Works, Inc., Houston, Tex.
[21] Appl. No.: 873,931
[22] Filed: Jan. 31, 1978
[51] Int. Cl.² ............... F16K 11/06; F16K 45/00
[52] U.S. Cl. ............... 137/625.68; 137/625.11; 92/53
[58] Field of Search ............... 137/625.11, 625.48, 137/625.66, 625.25, 625.68; 251/63.4; 92/52, 53

[56] References Cited

U.S. PATENT DOCUMENTS

| | | | |
|---|---|---|---|
| 3,417,670 | 12/1968 | Madland | 92/52 |
| 3,530,893 | 9/1970 | Masuda | 137/625.25 |
| 3,683,966 | 8/1972 | Payne | 137/625.48 |
| 3,917,220 | 11/1975 | Gilmore | 137/625.25 X |
| 3,934,423 | 1/1976 | Haller | 92/52 |
| 3,952,763 | 4/1976 | Baugh | 137/625.11 |

*Primary Examiner*—William R. Cline
*Attorney, Agent, or Firm*—Vinson & Elkins

[57] ABSTRACT

A multiple position valve which has a set of nesting actuating pistons whose strokes are limited to properly position the valve. The varying pilot pressure applied to the nested pistons is opposed at the opposite end of the valve by a fixed supply pressure exerted on a single piston. Pilot pressure as it is increased moves the nested piston until each one reaches the end of its stroke so that a predetermined pilot pressure will move the nested pistons to a certain seating of selected pistons and thereby position the valve at its desired position.

4 Claims, 4 Drawing Figures

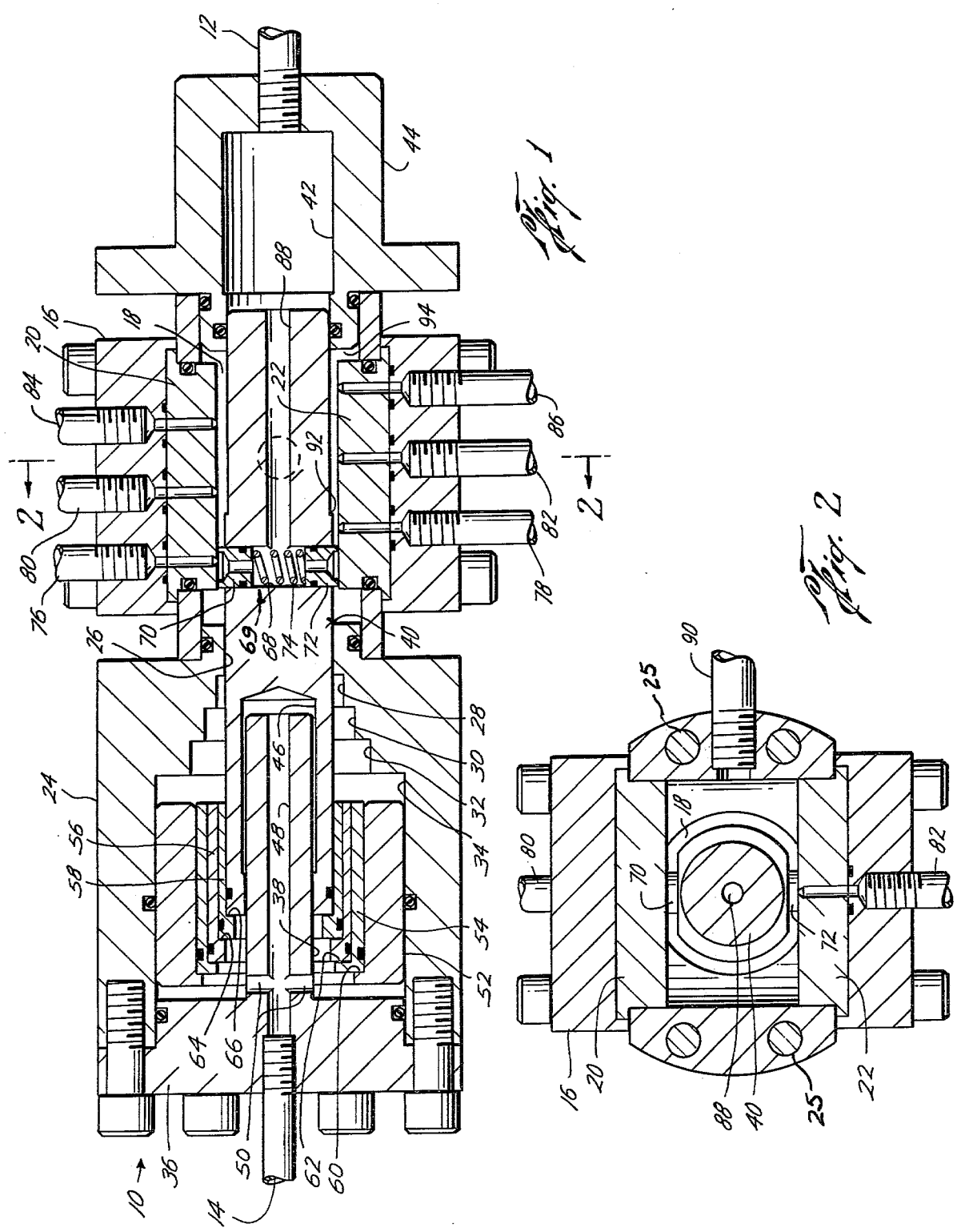

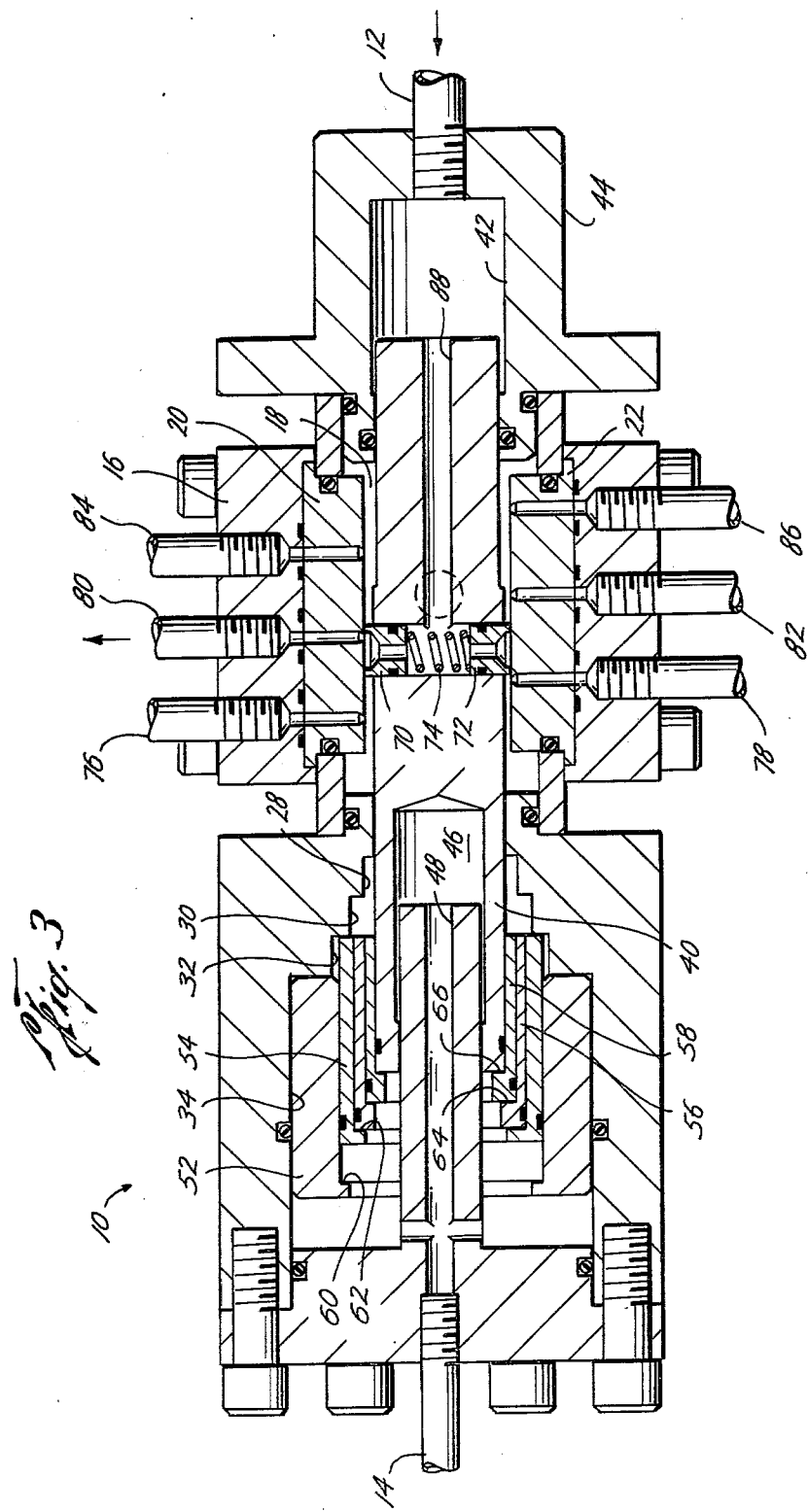

MULTIPLE POSITION VALVE

BACKGROUND OF THE INVENTION

The control of subsea well head equipment from a platform includes the use of multiple hydraulic control lines or subsea sequential valves to minimize the number of control lines extending to the subsea well head. Having a single control line leading to the subsea well head is advantageous provided that its operation of each of a number of pieces of equipment is assured. Difficulty has been encountered in the past with sequential valves having a dead space or inoperative region so that pressures which should switch the valve to a certain control function may not be quite sufficient, because of friction losses, and therefore, the desired function may not be turned on.

A summary of the use of such sequential valves is set forth in an article entitled "Sequential Hydraulic Valve Controls All Production Functions Through One Line" in the January 1977 issue of Ocean Industry.

The Benton F. Baugh U.S. Pat. No. 3,952,763 shows one example of the prior art sequential control valve. The Vivian H. Payne U.S. Pat. No. 3,683,966 shows an example of a multiple position valve using shear valves to cover or uncover ports extending through the valve body and being shifted with the piston in which they are mounted responsive to pilot pressure on one end of the piston and operational pressure on the other end of the piston.

SUMMARY

The present invention relates to an improved multiple position valve.

This improved valve has a body with a central bore and a plurality of counterbores at one end and a main piston slidable axially in the central bore, a plurality of nested pistons slidable in said counterbores, a plurality of control ports and an exhaust port extending through said body intermediate the ends of said main piston, a supply port extending into said central bore to expose one end of said main piston to supply pressure, valve means carried by said main piston in communication with said supply port and coacting with said control ports to deliver supply pressure fluid to at least one of said control ports in accordance with the position of said piston, and a pilot port through said body into said counterbores to urge said nested pistons and said main piston toward the opposite end of said body, the nested pistons being sized and the counterbores being arranged and sized so that preselected pressures move said main piston and thus said valve means to selected positions to communicate sequentially with said control ports.

This improved structure provides a multiple position valve with minimum dead bands for each sequential step movement of the piston and will move sequentially in both directions.

BRIEF DESCRIPTION OF THE DRAWINGS

The details of the improved valve of the present invention are hereinafter set forth with reference to the drawings wherein:

FIG. 1 is a longitudinal sectional view of the improved valve of the present invention with the shear valve in communication with the first control port;

FIG. 2 is a transverse sectional view taken along line 2—2 in FIG. 1;

FIG. 3 is a sectional view similar to FIG. 1 but showing the shear valve in communication with the third control port.

DESCRIPTION OF THE PREFERRED EMBODIMENT

Figure 4:
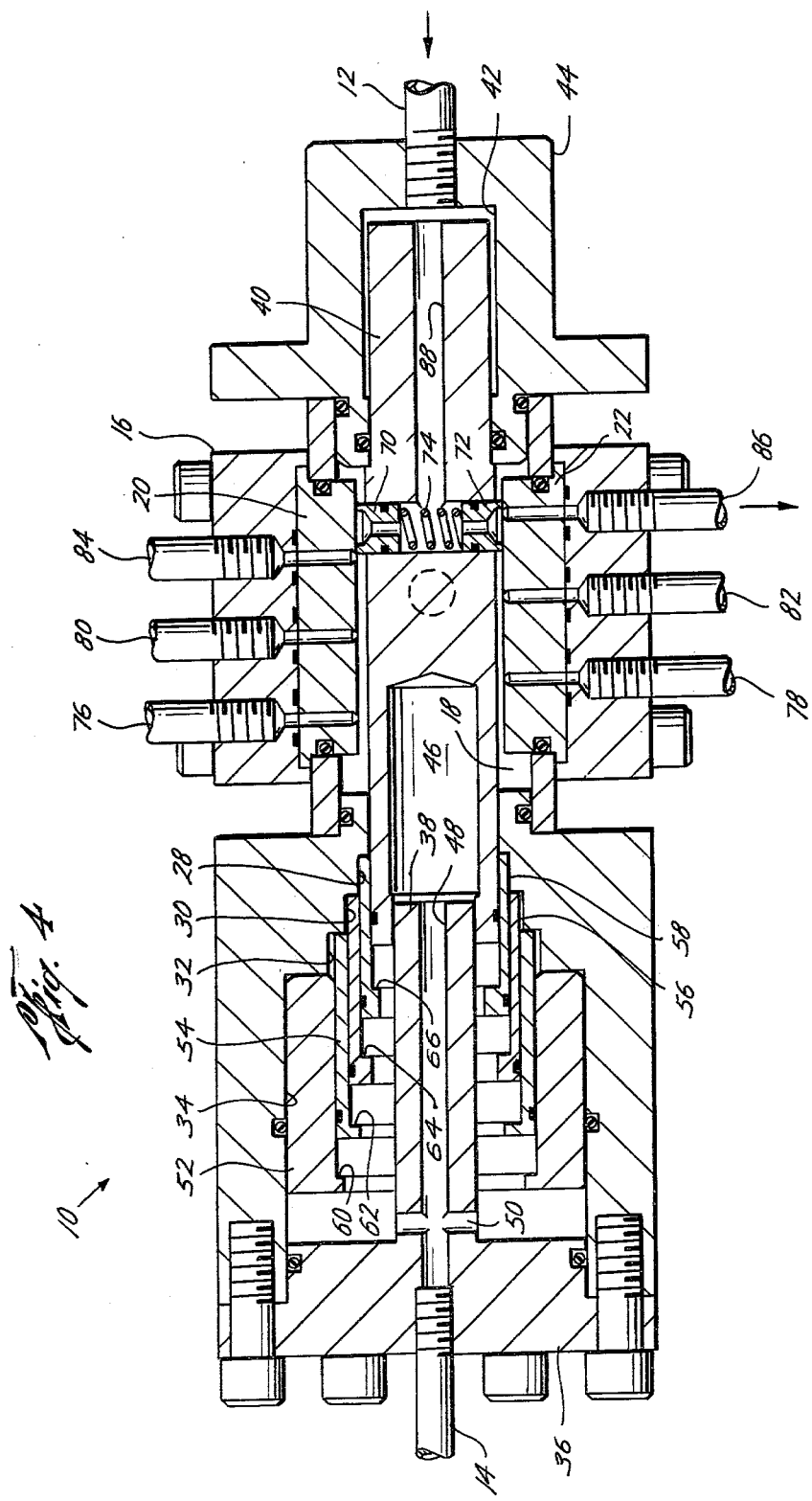
FIG. 4 is another similar view showing the shear valve in communication with the last control port and with the pistons all moved fully to the right.

The improved multiple position valve 10 is shown in FIG. 1 in its unpressured condition with supply pressure being provided through line 12 but without any pilot pressure supplied through line 14. The valve 10 includes the valve body 16 having a central recess or bore 18 in which the ported plates 20 and 22 are mounted. The cylinder body 24 is secured by screws 25 to the valve body 16 and has a central bore 26 and a plurality of counterbores 28, 30, 32 and 34. The head 36 is secured to cylinder body 24 and includes tubular guide 38 which projects axially into the counterbores 28 through 34 as shown.

The piston 40 is positioned within central bore 26 of body 24 and extends through recess 18 in body 16 terminating within the bore 42 in cap 44 which is secured to body 16. Piston 40 includes the recess 46 to receive shaft 38 as shown.

Passage 48 extends from the connection to pilot line 14 through head 36 and shaft 38 into communication with recess 46. Also transverse passage 50 communicates with the head end of the counterbores to expose the nested sleeve pistons 52, 54, 56 and 58 to pilot pressure. Piston 52 is slidable in counterbore 34 and its shoulder 60 engages the outer end of piston 54. Piston 54 is slidable within counterbore 32 and piston 52 and includes shoulder 62 engaging the outer end of piston 56. Piston 56 is slidable within counterbore 30 and piston 54 and includes shoulder 64 engaging the outer end of piston 58. Piston 58 is slidable within counterbore 28 and piston 56 and includes shoulder 66 engaging the outer end of piston 40 as shown in FIG. 1.

The transverse bore 68 extends through piston 40 and the shear valve 69 includes ring valve members 70 and 72 which are mounted therein and urged into engagement with the inner surfaces of ported plates 20 and 22 by the spring 74. The porting through the plates 20 and 22 communicates with the control lines 76, 78, 80, 82, 84 and 86 as shown. Passage 88 extends through the end of piston 40 to provide communication from bore 42 of cap 44 to the port in plates 20 and 22 which is uncovered by valve members 70 and 72. Thus, supply pressure from line 12 is connected into bore 42 and through passage 88 into the port covered by one of valve members 70 and 72. In this manner, one of the control lines is activated and the remainder of the control lines are in communication with exhaust line 90 extendng from recess 18 as shown in FIG. 2.

While the right end of piston 40 is exposed to supply pressure the left hand end of piston 40 and the nested pistons 52 through 58 are exposed to pilot pressure from line 14. The counterbores are of preselected lengths to limit the strokes of their respective sleeve pistons so that the valve members 70, 72 may be positioned with respect to the porting in plates 20 and 22.

A typical example of the operation of the improved valve of the present invention is to provide supply pressure of 3,000 psi to supply line 12. With no pilot pressure delivered to line 14 the piston 40 and all of the nested sleeve pistons 52 through 58 are at their left position as shown in FIG. 1 and the shear valve 69 is in communication with control line 76 so that supply pressure is supplied thereto and control lines 78, 80, 82, 84 and 86 are vented through exhaust line 90.

When a pilot pressure of 600 psi is supplied through line 14 into the outer end of the counterbores 28–34, the pilot pressure is sufficient to cause the nested pistons 52 to 58 and piston 40 to move to the right until sleeve piston 52 bottoms on the shoulder at the end of counterbore 34. In this position the valve members 70, 72 have moved to bring valve member 72 into communication with the port in plate 22 which extends from control line 78 so that supply pressure is delivered to control line 78.

A pilot pressure of 1200 psi causes sleeve pistons 54 to 58 and piston 40 to move to the right until piston 54 bottoms on the shoulder at the end of counterbore 32. In this position valve member 70 is in communication with the port in plate 20 which extends from control line 80 as shown in FIG. 3.

A pilot pressure of 1800 psi causes sleeve pistons 56 and 58 and piston 40 to move to the right until piston 56 bottoms on the shoulder at the end of counterbore 30. In this position, valve member 72 is in communication with the port in plate 22 which extends from control line 82.

A pilot pressure of 2400 psi causes sleeve piston 58 and piston 40 to move to the right until piston 58 bottoms on the shoulder at the end of counterbore 28. In this position, valve member 70 is in communication with the port in plate 20 which extends from control line 84.

A pilot pressure of 3000 psi causes piston 40 which is larger on its left end to move to the right until its shoulder 92 engages the shoulder 94 on cap 44. In this position, valve member 72 is in communication with the port in plate 22 which extends from control line 86 as shown in FIG. 4.

While the foregoing example is illustrative only, it does show that the improved valve 10 of the present invention can be positioned at any one of a plurality of positions to establish supply pressure to a particular control line by controlling the pilot pressure supplied to the actuating pistons. The area ratios of the nesting sleeve pistons and the effective pressure area of the two ends of piston 40 are all preselected so that a particular pilot pressure will actuate the piston 40 and shear valve 69 to a particular position.

By having substantial piston areas with respect to the diameter of the seal rings only limited frictional resistance is encountered and the dead band for valve 10 is thereby minimized. For a supply pressure of 2000 psi the dead band is from 30 to 50 psi. This allows stable operation of the valve with both increasing and decreasing pressure steps which are typically 400 psi apart when supply pressure is 2000 psi. This compares favorably with a dead band from 100 to 150 psi for prior devices.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A multiple position valve, comprising
   a body having an internal bore, and a plurality of stepped counterbores coaxial with said bore and forming a series of stepped shoulders,
   a first piston mounted for reciprocation in said bore,
   means for introducing supply fluid at a reference pressure into said bore at one end of said piston,
   a plurality of nested pistons connected to the opposite end of said piston,
   each one of said nested pistons being of a diameter to enter one of said counterbores and engage its shoulder so that as said nested pistons progressively engage the shoulders of their respective counterbores the smaller of said nested pistons are free to move toward their counterbores' shoulders,
   a plurality of control ports, a supply port and an exhaust port through said body,
   means for delivering said supply fluid to one of said control ports and establishing communication to said exhaust port from the remainder of said control ports, and
   means for introducing a pilot pressure fluid into said counterbores to urge said nested pistons and said first piston in the opposite direction from the direction in which said first piston is urged by said supply fluid,
   said nested pistons having preselected areas whereby preselected fluid pressure exerted on said nested pistons moves said nested pistons to positions at which communication is established with preselected ones of said control ports.

2. A valve according to claim 1, wherein said delivering and establishing means includes
   at least one ported plate mounted within said internal bore with its ports in communication with said control ports,
   a shear valve carried by said first piston and being in sealing engagement with said ported plate,
   a passage communicating with said shear valve from said supply port,
   said shear valve communicating with at least one of the ports in said plate in each position of said piston.

3. A valve according to claim 2 wherein said shear valve includes,
   a pair of opposed ring valve members mounted in a transverse bore through said first piston,
   a second ported plate, having its ports in communcation with some of said control ports, mounted in said internal bore opposite the first plate,
   means for resiliently urging said valve members into sealing engagement with said ported plated.

4. A valve according to claim 1, wherein
   there are at least four nested pistons and at least six control ports whereby said first piston has six possible positions which are assumed by the application of predetermined quantities of pilot pressure.

* * * * *